United States Patent [19]

Stock et al.

[11] 4,019,947

[45] Apr. 26, 1977

[54] MULTIPURPOSE SEALING AND SEVERING METHOD AND MECHANISM

[75] Inventors: David K. Stock; Robert J. Wech, both of Green Bay, Wis.

[73] Assignee: FMC Corporation, San Jose, Calif.

[22] Filed: Sept. 10, 1975

[21] Appl. No.: 612,059

[52] U.S. Cl. ................................ 156/510; 93/33 H; 156/250; 156/290; 156/515; 156/583

[51] Int. Cl.[2] ........................................ B32B 31/00

[58] Field of Search .......... 156/250, 251, 510, 515, 156/583, 290, 380, 359; 93/33 R, 33 H, 35 R, DIG. 1; 53/182

[56] References Cited

UNITED STATES PATENTS

| | | | |
|---|---|---|---|
| 3,257,256 | 6/1966 | Lehmacher et al. .......... | 156/515 X |
| 3,384,528 | 5/1968 | Lehmacher et al. .............. | 156/515 |
| 3,775,225 | 11/1973 | Schott ............................ | 156/583 X |
| 3,813,998 | 6/1974 | Lotto ............................. | 156/498 X |

*Primary Examiner*—David A. Simmons
*Attorney, Agent, or Firm*—A. J. Moore; C. E. Tripp

[57] ABSTRACT

A multipurpose sealing and severing mechanism for a bag machine capable of providing one or more seals in thermosealing wrapping material, and severing or perforating the material adjacent the seal area. The mechanism may readily be adapted to produce side weld bags from longitudinally folded wrapping material; open end first bags from tubular wrapping material; closed end first bags from tubular material; or sheets from single or multiple webs. The mechanism includes a stationary sealing head and a reciprocating sealing head each of which includes a pair of spaced resistance wire heaters with an oscillating cutter or perforator movable therebetweento either completely sever or merely perforate the material. Resiliently loaded, segmented film clamps extend parallel to and immediately adjacent the cutter and apply a holding force on both sides of the cutter throughout the length of cut during the severing operation to thereby firmly clamp the web preventing undesirable stresses from being applied to the seal area during the severing operation.

30 Claims, 21 Drawing Figures

FIG_13
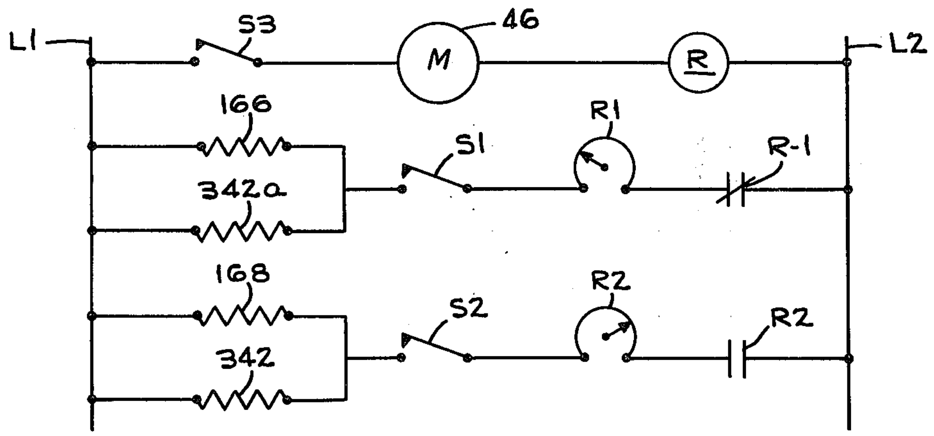
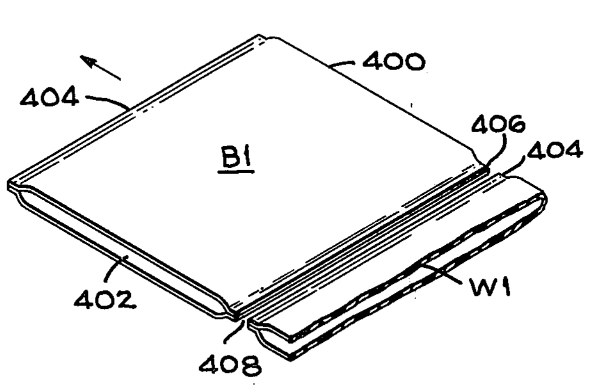
FIG_14
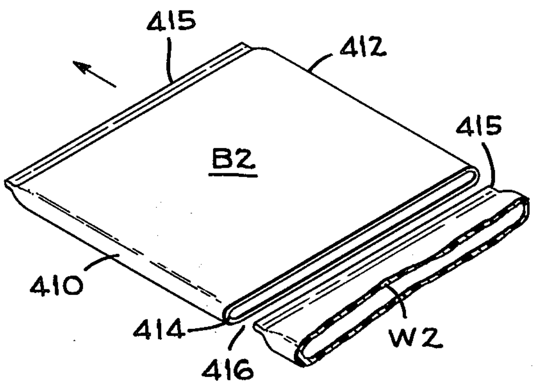
FIG_15
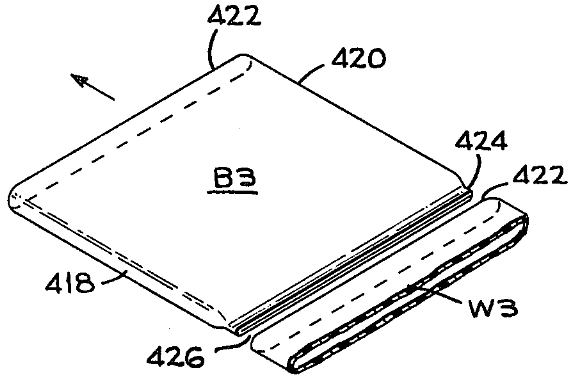
FIG_16
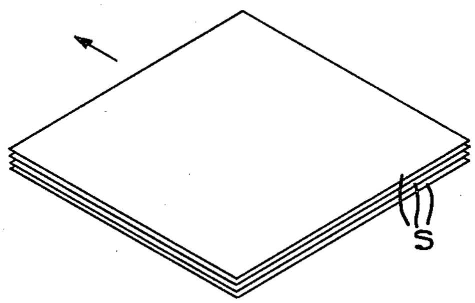
FIG_17

MULTIPURPOSE SEALING AND SEVERING METHOD AND MECHANISM

BACKGROUND OF THE INVENTION

1. Field of the Invention

This invention pertains to the bag making art and more particularly relates to a multipurpose sealing mechanism capable of making a plurality of different sizes, types, and styles of bags and/or sheets with a minimum of changeover time.

2. Description of Prior Art

In the thermosealing or thermoplastic bag making industry, bag producers are frequently required to make batches of bags in accordance with specific customer demands; which demands may require bags which vary considerably in size, shape, thickness, and types. Thus, prior art bag machines were made with changeover kits so that they could operate as either side weld machines, or bottom weld machines open end first or closed end first. This general type of machine could also be used to make sheets from web material provided the proper kit was installed on the machine.

U.S. Pat. No. 3,663,338 which issued on May 16, 1972 to Robert J. Wech illustrates a side weld machine. The side weld macine makes bags from a thermoplastic web which is foled longitudinally and accordingly is termed a J-fold. The machine intermittently passes a web between a heated reciprocaing hot knife and a seal roller. Each stroke of the hot knife against the web both severs the web and heat seals both sides of the cut. This type of machine may also be used to form sheets of thermoplastic material from a web of the material.

Lotto U.S. Pat. No. 3,813,998 which issued on June 4, 1974 disclosed a bag machine that uses tubular web material and has many components identical to the Wech machine but is provided with a bottom weld, closed end first kit. This kit requires; that the Wech type seal bar be replaced by an upper seal bar and knife assembly with the knife disposed downstream of the seal bar, that the Wecg roller be replaced by a stationary seal pad, that draw rolls of the machine be retimed to reverse the film thus stripping the film from the seal pad prior to advancing the web for another bag, and that a special film tensioning pick-off mechanism disposed downstream of the hot knife be provided to tension the film during the cutting operation to provide a better cut and prevent welding the open end of the bag closed.

A third type of bag machine, known as a bottom weld, open end first machine, is similar to the Lotto machine except that the change-over kit requires a sealing and severing head that places the hot knife upstream of the seal bars, does not require retiming of the draw rolls as compared to the Wech machine mentioned above, and does not require a special film tensioning pick-off mechanism as in the Lotto machine above.

Wech U.S. Pat. No. 3,779,838 which issued on Dec. 18, 1973 illustrates a bottom weld, closed end first machine which utilizes elongated heat sealing bars that are connected to associated rigid beams by a plurality of support bars rigidly attached to the beams. The support bars are secured to elongated heat sealing bars by resilient clamps thereby minimizing the problem of unequal sealing pressures being applied to the sealing bars due to uneven heat expansion of the bars.

SUMMARY OF THE INVENTION

The multipurpose sealing mechanism of the present invention is capable of forming side weld bags from a J-fold web; bottom weld, open end first or closed end first bags from tubular webs, and sheets from unfolded webs without requiring any major mechanical alterations of the bag machine. Adaptation of the machine to the several above requirements are performed by the use of all or selected ones of the resistance wire heating elements, the possible retiming of the draw rolls for open end first bags, and the adjustment of the depth of cut of the cutter if it is desired to maintain the bags attached to each other by merely perforating, rather than completely severing the areas between each bag.

It is therefore one object of the present invention to provide a multipurpose sealing and severing method and mechanism for a bag machine.

Another object is to provide a single sealing and severing head capable of forming articles from thermoplastic material; such as sheets, side weld bags, bottom weld bags open end first, and bottom weld bags closed end first and with the articles either completely severed from each other or attached to each other but with perforations therebetween.

Another object is to provide a segmented web clamping device for applying a uniform clamping pressure to a wide web during a heat sealing and severing operation.

In accordance with the present invention a multipurpose sealing and severing mechanism is provided which includes pairs of opposed sealing bars, means for reciprocating one pair of sealing bars between an inoperative position spaced from the other bars and an operative position in sealing engagement with the other bars, intermittently operated web drive means for moving a web of wrapping material between said pairs of bars when in their inoperative positions, an electrical resistance heating wire in each sealing bar, means for severing the web along a plane between the sealing bars of each opposing pair of bars, segmented clamp means on each side of said severing means, and drive means for reciprocating said one pair of sealing bars and clamping means and for moving said severing means through the web when the web is stationary.

BRIEF DESCRIPTION OF THE DRAWINGS

FIG. 13 is a simplified electrical control diagram for the heating wires.

FIG. 14 is a perspective of a completed side weld bag.

FIG. 15 is a perspective of an end weld, closed end first bag.

FIG. 16 is a perspective of an end weld, open end first bag.

FIG. 17 is a perspective of several separate sheets cut from several layers of web stock.

DESCRIPTION OF THE PREFERRED EMBODIMENT

Figure 1:
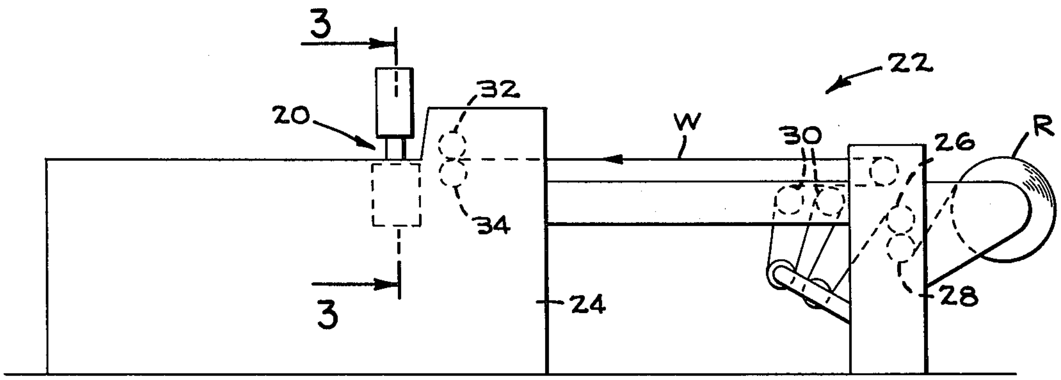
FIG. 1 is a diagrammatic side elevation of a bag machine incorporating the multipurpose sealing and severing mechanism of the pesent invention.

The multipurpose sealing and severing mechanism 20 (FIG. 1) of the present invention is illustrated as a component of the type of bag machine 22 disclosed in the aforementioned Wech U.S. Pat. No. 3,663,338 which is assigned to the assignee of the present invention and is incorporated herein by reference.

Figure 3:
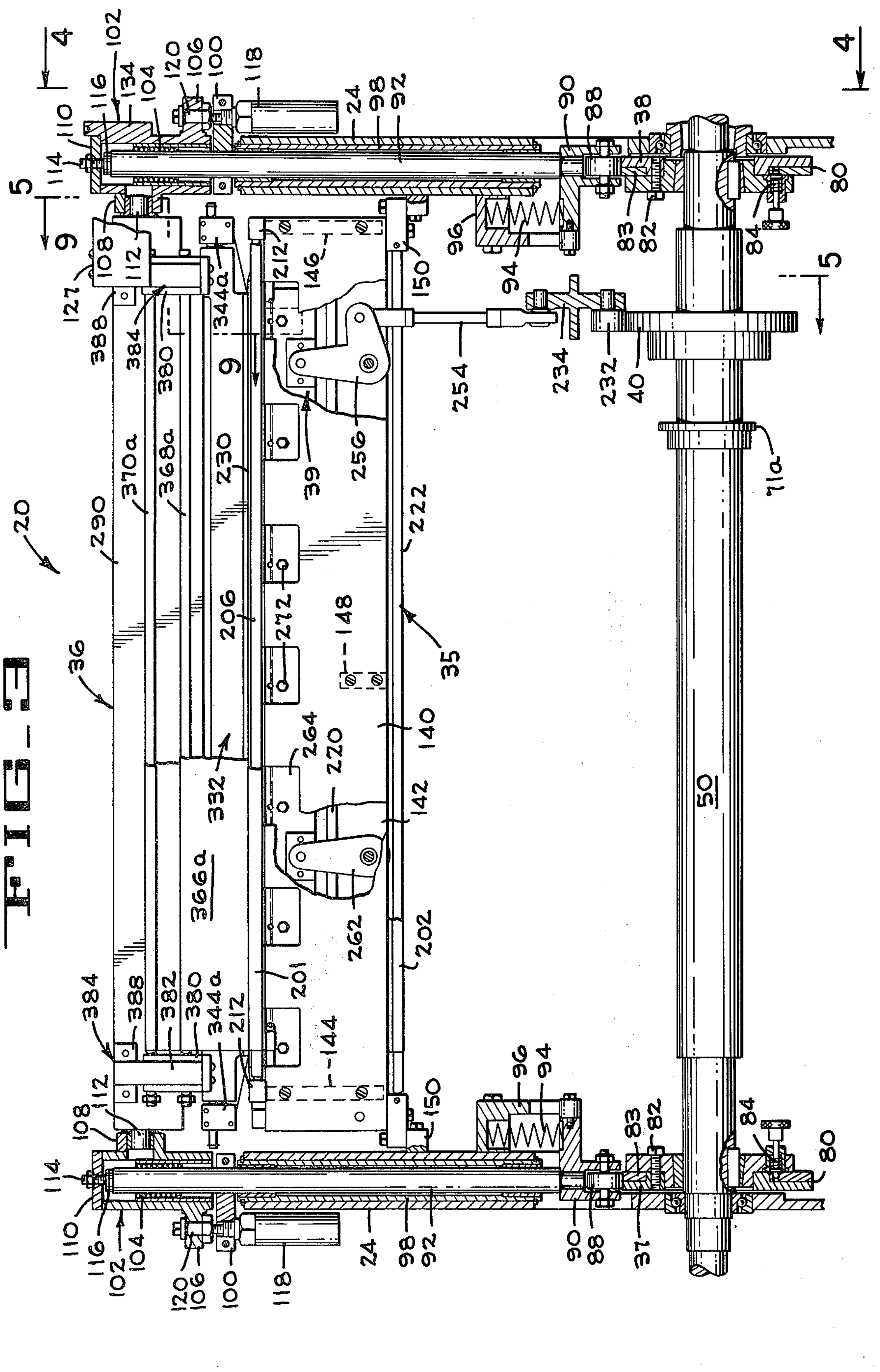
FIG. 3 is a transverse section taken along lines 3—3 of FIG. 1 illustrating the multipurpose sealing and severing mechanism of the present invention with the several components being in a sealing position.
Figure 5:
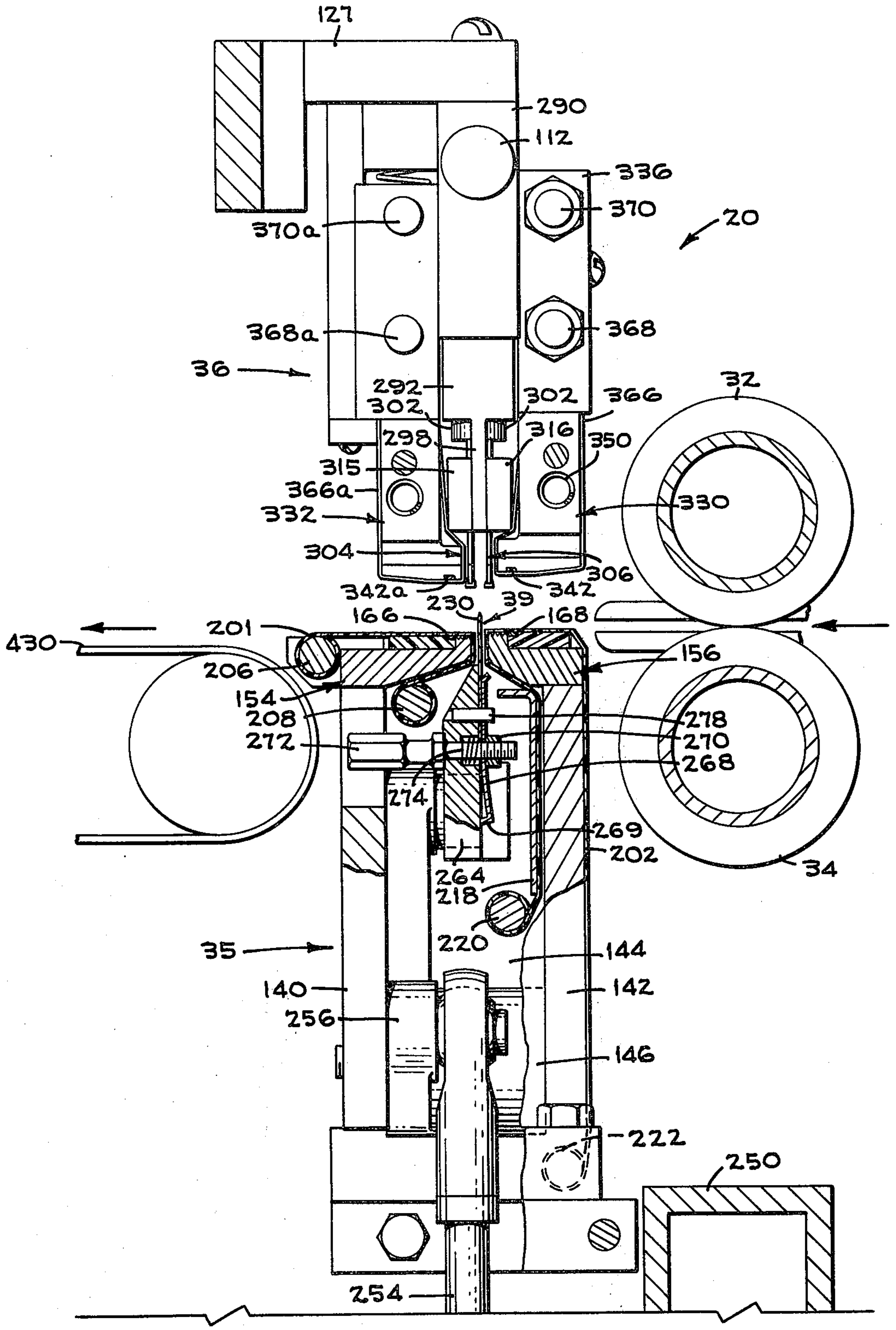
FIGS. 5 and 5A when combined define an enlarged section taken along lines 5—5 of FIG. 3 illustrating the upper and lower sealing heads in inoperative position spaced from each other and illustrating the mechanism for driving the oscillating cutter in active cutting position, certain parts being cut away.

In general, the bag machine 22 comprises a frame 24 which supports a roll R of film or wrapping material. The film or wrapping material is withdrawn from the roll as a web W that is trained through drive rolls 26,28 and a plurality of dancer rolls 30 to accommodate intermittent movement of the web in a manner well known in the art. The web W is intermittently driven through the multipurpose sealing and severing mechanism of the present invention by draw rolls 32,34. As best shown in FIGS. 3 and 5, the sealing and severing mechanism 20 includes a lower sealing head 35 that is rigidly secured to the frame 24, an upper sealing head 36 that is vertically reciprocated relative to the lower sealing head by cams 37,38, and an oscillating cutter assembly 39 that is actuated by a cam 40.

Figure 2:
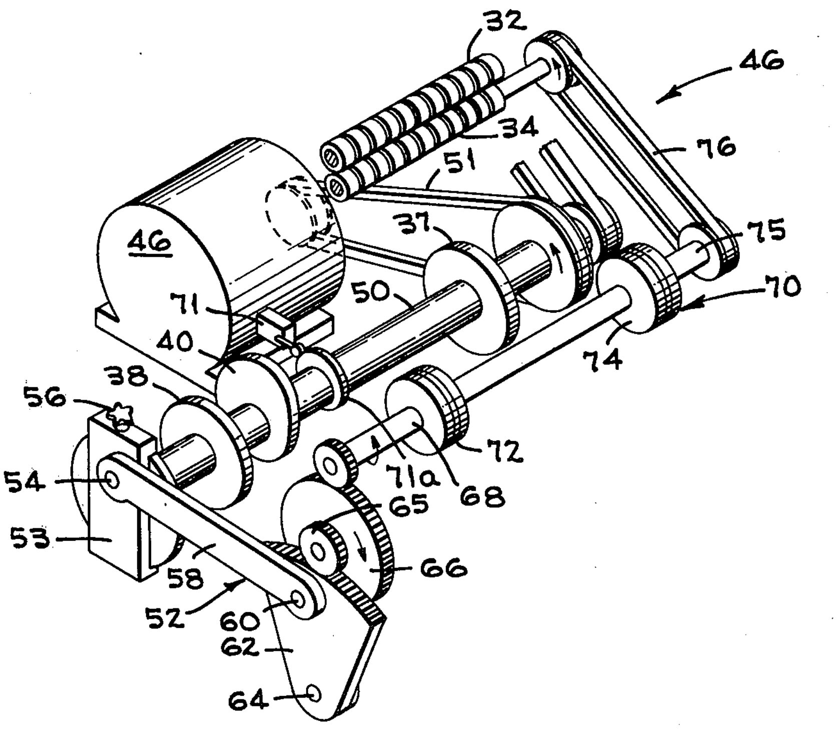
FIG. 2 is a diagrammatic perspective of a portion of the drive for the bag machine of FIG. 1.

As diagrammatically illustrated in FIG. 2, a drive mechanism 46 for the draw rolls 32,34 and sealing and severing mechanism 20 of the present invention receives its power from a motor 46 which drives a crank shaft 50 through a belt drive 51 one revolution for each article or bag cycle. A development change drive mechanism 52 includes a rotatable housing 53 secured to the crankshaft 50, and has a crank pin 54 projecting therefrom. The pin 54 is adjusted radially by a screw threaded adjustment device 56 which is fully described in the above mentioned Wech U.S. Pat. No. 3,663,338. The development change mechanism 52 may be adjusted during operation to provide bags of different longitudinal dimensions from the web W.

The draw rolls 32,34 are intermittently driven by a crank arm 58 pivotally connected between the crank pin 54 and a pin 60 secured to a gear sector 62 that is oscillated about a shaft 64 secured to the frame of the machine. The gear section 62 drives a pinion 65 and spur gear 66 journaled on the frame which, in turn, drives a continuously oscillating input shaft 68 of a clutch-brake assembly 70. The clutch-brake assembly 70 is of a type well known in the art and is more fully disclosed in the aforementioned Lotto U.S. Pat. No. 3,813,998 which is incorporated herein by reference. The clutch brake assembly is activated and deactivated by a switch 71 (FIG. 2) controlled by a cam 71a secured to the shaft 50.

The clutch 72 of the clutch-brake assembly 70 is engaged and the brake 74 is disengaged to drive an output shaft 75 of the clutch-brake assembly 70 through an arcuate range of 180° during each bag cycle to thereby advance the web one bag length. The output shaft 75 is connected to the lower draw roll 34 by a belt drive 76. During advancement of the web, the web starts from zero velocity, accelerates to a maximum velocity, and thereafter decelerates, finally terminating movement with the linear speed of the web at zero velocity. During the other 180° of rotation of the shaft 50, the clutch 72 is disengaged and the brake 74 is engaged to hold the output shaft 75 stationary.

The multipurpose sealing and severing mechanism 20 is driven from the crank shaft 50 by upper seal bar reciprocating cams 37,38 and by the cutter cam 40 as previously mentioned.

The reciprocating drive for the upper sealing head 36 (FIG. 3) is substantially the same as disclosed in aforementioned Wech U.S. Pat. No. 3,663,338, and accordingly will only briefly be described.

The cams 37,38 are variable dwell split cams thereby making it possible to change the sealing time to accommodate webs of different thicknesses of thermosealing characteristics. Each cam includes a two-piece body 80 connected together by capscrews 82 and keyed to the shaft 50. An annular cam ring 83 is slidably received on the associated body 80 and is locked in desired annular position by a spring detent 84 supported by the body and having its pin seated in a selected one of a plurality of arcuate holes in the ring 83.

Each cam 37,38 engages a cam follower 88 journaled on a bracket 90 secured to the lower end of a push rod 92. The cam follower is urged downwardly against the cam by a spring 94 disposed between the bracket 90 and another bracket 96 secured to the frame. The rod 92 is journaled in a vertical sleeve 98 rigid with the frame and has a split block clamp 100 secured near its upper end. A trunnion mount 102 is slidably received on the upper end of the rod 92 by a linear ball bushing 104 and includes a flange 106, a bushing 108 and a cap 110. The upper sealing head 36 includes stub shafts 112 which are journaled in the associated bushings 108. The cap 110 has a threaded hole threrein which receives a flat head height adjusting screw 114. This screw rests on a nylon disc 116 during normal operation and may be rotated to adjust the upper head 36 to the desired height relative to the lower head 35 by a screwdriver slot in the upper end of the screw and associated locknuts.

An air cylinder 118 is secured to the split block 110 and has its piston rod 120 secured to the flange 106 of the trunnion mount 102. During normal operation, air (from a controllable source not shown) at sufficient pressure is directed into the rod end of cylinder 118 to hold the adjustment screw 114 against the nylon disc 116 thus maintaining the proper vertical adjustment of the upper head for the sealing and severing operation. As mentioned in more detail in Wech U.S. Pat. No. 3,663,338, when web development is interrupted for any one of a variety of reasons, the upper head 36 continues to reciprocate. However, in order to prevent damage to the web during this time, air is directed into the closed end of the cylinder thus raising the reciprocating head 36 and preventing it from contacting and damaging the web.

Figure 4:
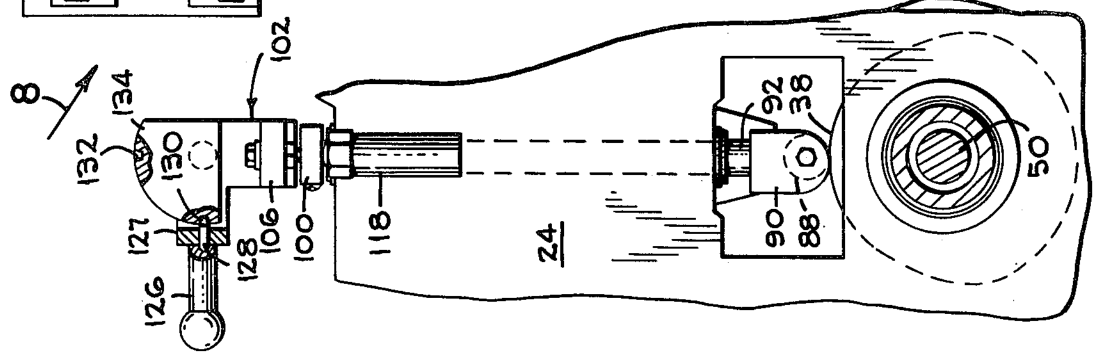
FIG. 4 is a side elevation of the mechanism of FIG. 3 looking in the direction of arrows 4—4 of FIG. 3.

The upper sealing head 36 may also be moved from the illustrated vertical operating position to a generally horizontal inoperative position by a manually operated latch device 126 (FIG. 4) that is secured to the upper head 36 by a bracket 127 and has a spring detent pin 128 that is selectively sealed in holes 130 or 132 formed in an arcuate portion 134 of one of the trunnion mounts 102.

The portion of the bag machine thus far described is substantially the same as that disclosed in the aforementioned Wech U.S. Pat. No. 3,663,338. The multipurpose sealing and severing mechanism 20 of the present invention which is incorporated in a bag machine including the above described feature is best illustrated in FIGS. 3 and 5–11.

Figure 6:
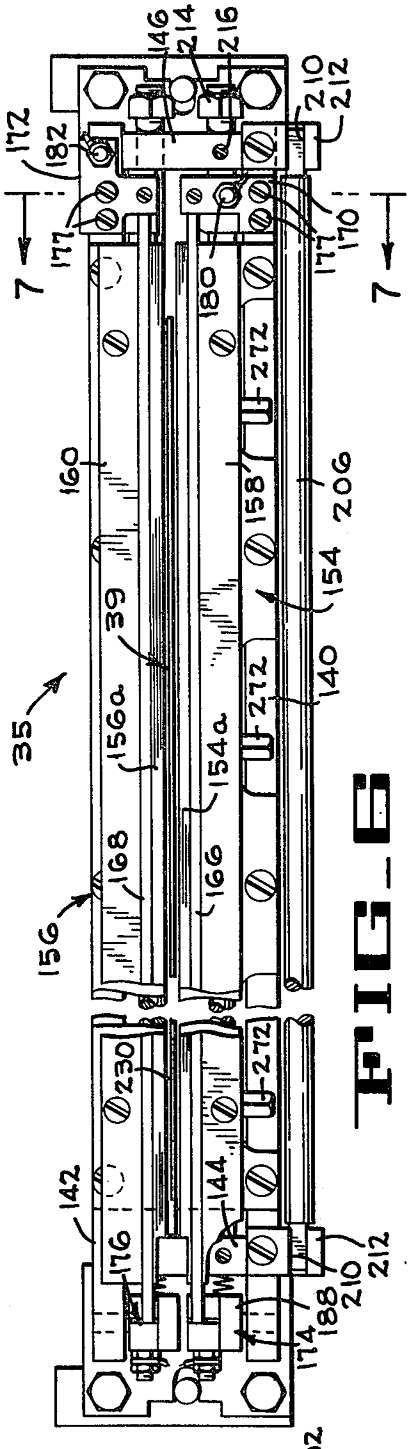
FIG. 6 is a plan of the lower sealing head with the central portion cut away.
Figure 8:
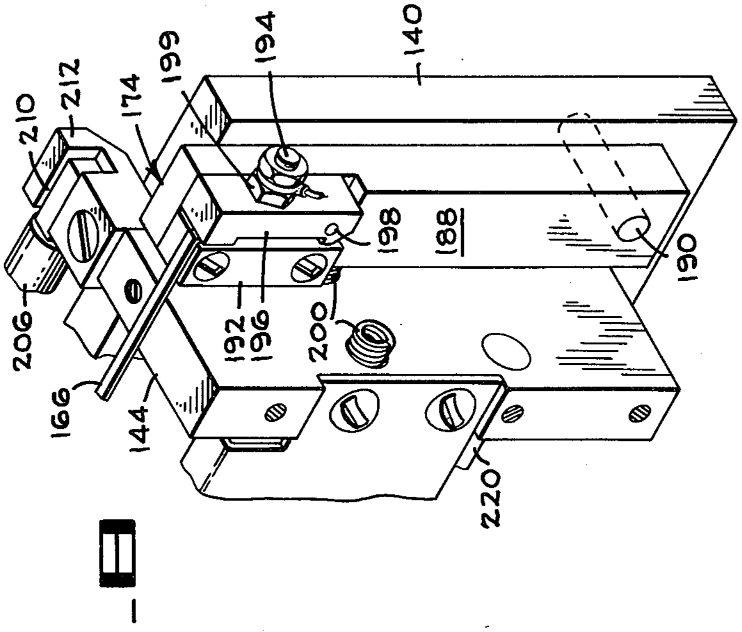
FIG. 8 is an enlarged perspective of one of the pivotal heating wire clamps for the lower heating wires looking in the direction of arrow 8 in FIG. 6.

The lower sealing head 35 comprises a pair of spaced transversely extending beams 140,142 bolted to end plates 144,146 and a central stiffening plate 148. The beams 140,142 are rigidly secured to the frame 24 by brackets 150 and cooperating capscrews. As best shown in FIG. 5, transversely extending lower seal bars 154, 156 are bolted to the beams 140,142, respectively and include upwardly projecting straight knurled or grooved web gripping portions **154*a*,156*a*. Split seal pads 158,160 are secured to the seal bars 154,156 respectively. The pads 158,160 are formed from an electrical and heat insulating material and each pad has a notch therein for receiving flat electrical resistance (ni-chrome) heating wires 166,168 (FIG. 6). Each wire is held in place by rigid terminal clamps 170,172 and pivotal terminal clamps 174,176.**

Figure 7:
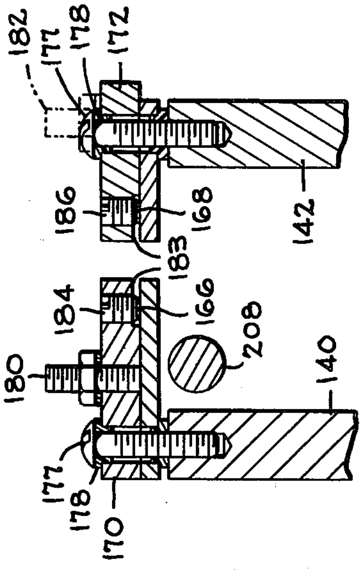
FIG. 7 is an enlarged vertical section taken along lines 7—7 of FIG. 6 illustrting stationary clamps for the lower electrical heating wires.

The rigid clamps 170,172 (FIGS. 6 and 7) are two piece metal plates that are secured to the beams 140, 142 by screws 177 extending through insulating shouldered washers 178 (FIG. 7). Each clamp includes a threaded terminal 180,182 connected to a suitable source of power, and a relieved portion 183 for receiving the flat wires. The wires are clamped to the associated blocks by set screws 184,186.

In order to maintain the resistance heating wires 166,168 tight, and to compensate for expansion and contraction, the other ends of the wires 166,168 are connected to the pivotal clamps 174,176, respectively. The clamps 174,176 are substantially the same and accordingly only clamp 174 (FIG. 8) will be described. The clamp 174 includes an arm 188 of electrical insulating material, such as nylon, pivoted to the associated beams 140 by a pivot pin 190. An electrically conductive clamp block 192 is rigidly secured to the arm 188 and includes an electrical terminal 194. Another clamp block 196 is pivoted to the arm 188 by pivot pin 198 and is apertured to loosely receive the terminal 194. A nut 199 on the terminal firmly clamps the bent over portion of the wire 166 to the clamp block 174. A compression spring 200 is disposed between the end plate 144 and the flat bottom of a bore in the associated arm 188 to urge the arm in a direction which will tension the wire 166.

In order to prevent melted thermosealing web material from sticking to the lower heating wires 166,168, wide Teflon cloth aprons 201 and 202 (FIG. 59 are trained over the wires 166,168, respectively. The Teflon cloth apron 201 is wound between two spools 206 and 208. The spool 206 (FIGS. 6 and 8) has squared end portions which are received for easy removal in complimentary open ended slots 210 formed in spool supporting brackets 212 secured to the end plates 144,146. The spool 208 (FIG. 5) has end portions journaled in the end plates 144,146 with a nut 214 (FIG. 6) screwed on one end for ease in manual rotation of the spool. The spool 208 is held from axial displacement and from free rotation by set screws 216 which are frictionally received in an annular groove (not shown) in the end portions of the spool. Thus, when the portion of the cloth apron 201 lying above the heating wire 166 is worn, the spool 206 is lifted from its support slots, is turned 90° and is reinserted in the slot 210, after first rotating the spool 208 an equivalent amount thereby presenting another surface of the cloth apron to the wire 166.

Similarly, the Teflon cloth apron 202 (FIG. 5) is trained around the heating wire 168, an angle guide plate 218, and spools 220 and 222 which are supported by the lower sealing head 35 in a manner similar to the spool 208. The angle guide plate 218 is secured to the end plates 144,146 (FIG. 6) by bolts.

Figure 12:
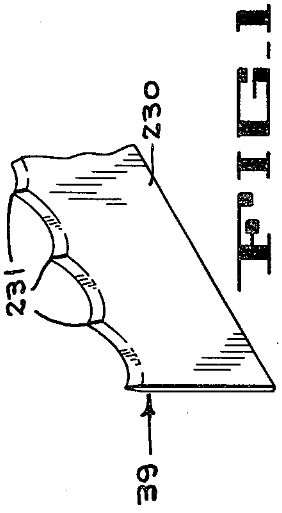
FIG. 12 is an enlarged perspective of a fragment of the toothed knife.

As best shown in FIGS. 3 and 5, a web severing knife or cutter blade 230 is mounted for oscillation through the web W during the dwell of the draw roll cycle. The cutter 230 is peferably a toothed knife (FIG. 12) which extends transversely of the machine 22. During the cutting operation the toothed edge of the cutter projects upwardly between and above the lvel of the sealing pads 158,160 as indicated in FIG. 5 to completely sever the web. If, however, it is desired to merely perforate the web, as opposed to cutting completely through the web, the cutter assembly 39 is adjusted to permit only the tooth points 231 of the cutter to penetrate the web.

Figures 5A, 5B:
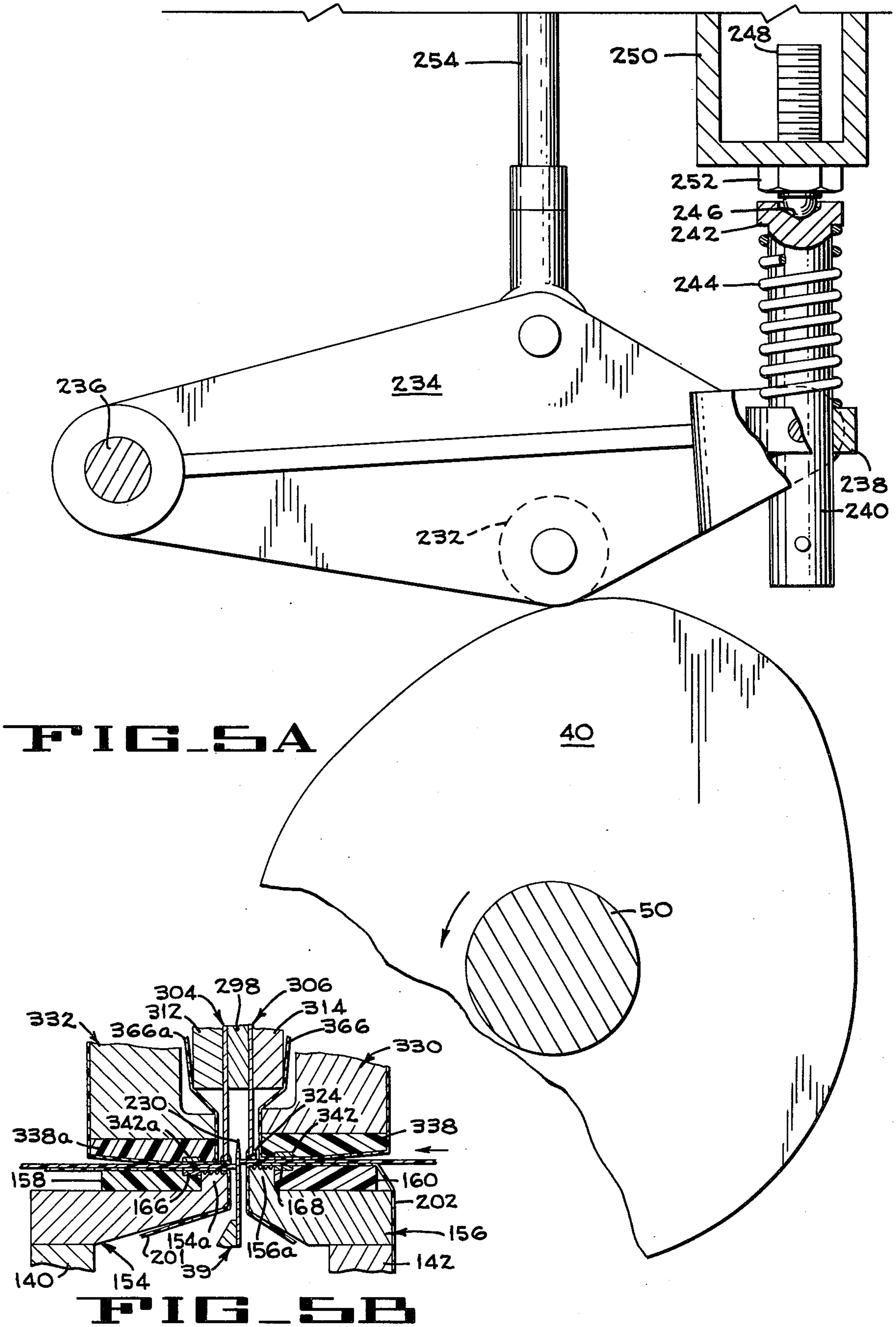
FIG. 5B is an enlarged section taken along lines 5—5 of FIG. 3 through a fragment of the upper and lower sealing heads when in operative sealing position illustrating the clamping elements in engagement with the web and the knife cutting through the web.

The cutter 230 is actuated gy the previously described cutter cam 40 (FIG. 5A) which is secured to crank shaft 50 and engages a cam follower 232 journaled on a crank arm 234. The crank arm 234 is connected to the frame 24 by a pivot shaft 236 and has a forked end pivotally supporting a collar 238 therebetween. An upright shaft 240 having a flange 242 on its upper end is slidably received in the collar and supports a helical compression spring 244 between the adjacent surfaces of the flange 242 and the collar 238. An identation 246 in the upper surface of the flange 242 receives the rounded end of an adjustment screw 248 that is screwed into a box beam 250 of the frame 24 and is locked in place by a lock nut 252. The adjustment screw 248 and spring 244 assure that the cam follower 232 firmly contacts the cam 40 at all times.

An adjustable link 254 enables the cutter to be used to either completely cut through the web or merely to perforate the web as mentioned above. The link 254 is pivotally connected between the crank arm 234 and a bell crank 256 (FIG. 3) that is pivotally connected between beams 140,142 of the lower sealing head 35. A lever 262 is similarly pivoted between the beams 140, 142 and pivotally supports one end of the cutter mounting beam 264 while the other end of the cutter beam is pivotally supported by the upper end of the bell crank 256.

In order to easily remove the cutter blade 230 for sharpening or replacement, a plurality of spaced spring clamps 268 (FIG. 5) having inturned lower edges 269 and nuts 270 welded thereto are secured in clamping engagement against the cutter blade 230 and cutter beam 264 by elongated shouldered cutter clamp bolts 272 which are screwed into the associated nuts 270. Coil springs 274 are received in counterbores in the cutter beam 264 and serve to force the clamps away from the cutter to facilitate easy cutter removal when the clamp bolts 272 are loosened. Roll pins 278 are seated in holes in the cutter beam and serve to support the lower edge of the cutter blade 230. The pins also pass through holes in the spring clamps 268 and maintain them in desired vertical alignment.

Figure 9:
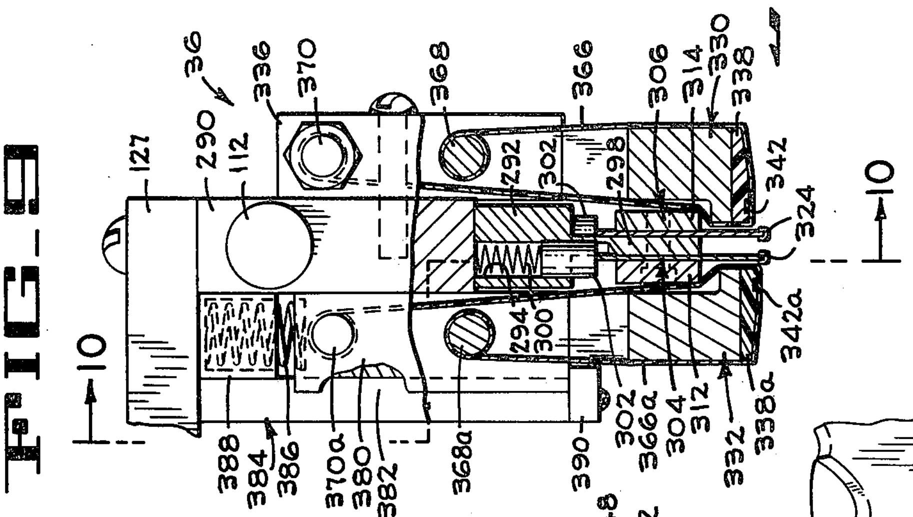
FIG. 9 is an enlarged vertical section taken along lines 9—9 of FIG. 3 illustrating the upper sealing head.
Figure 10:
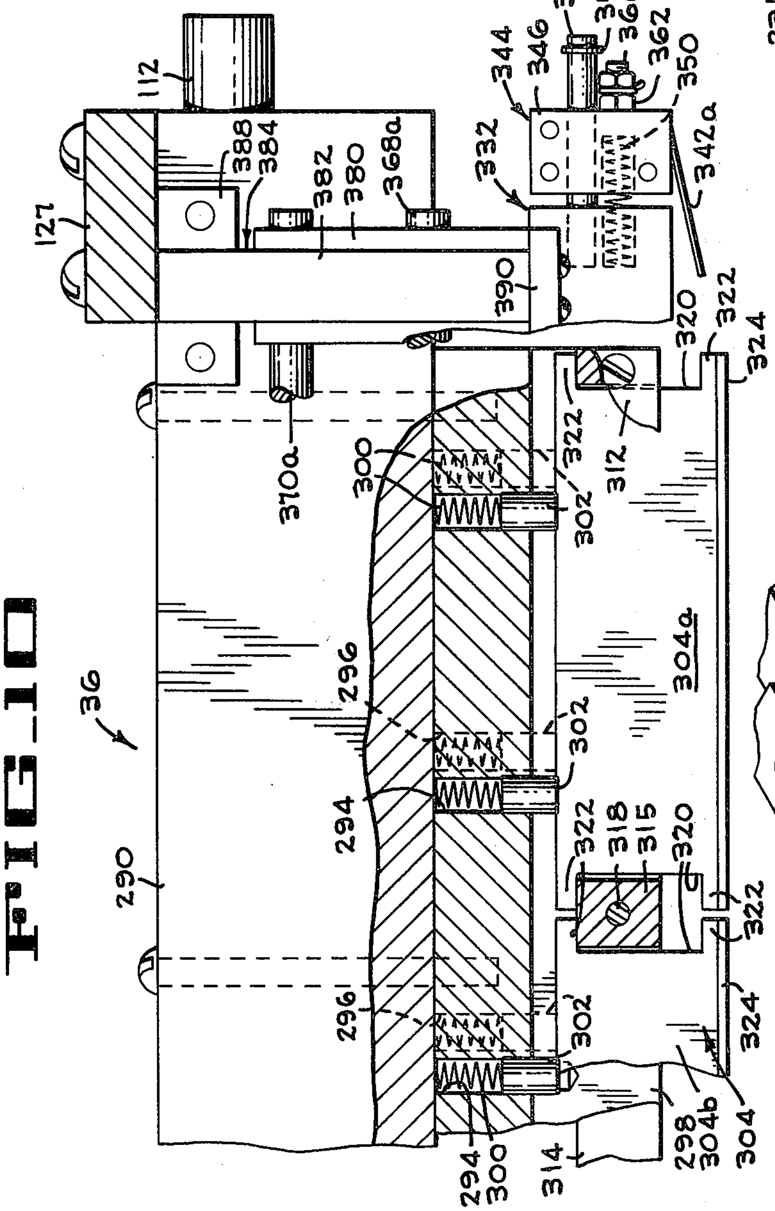
FIG. 10 is a section taken along lines 10—10 of FIG. 9.
Figure 10A:
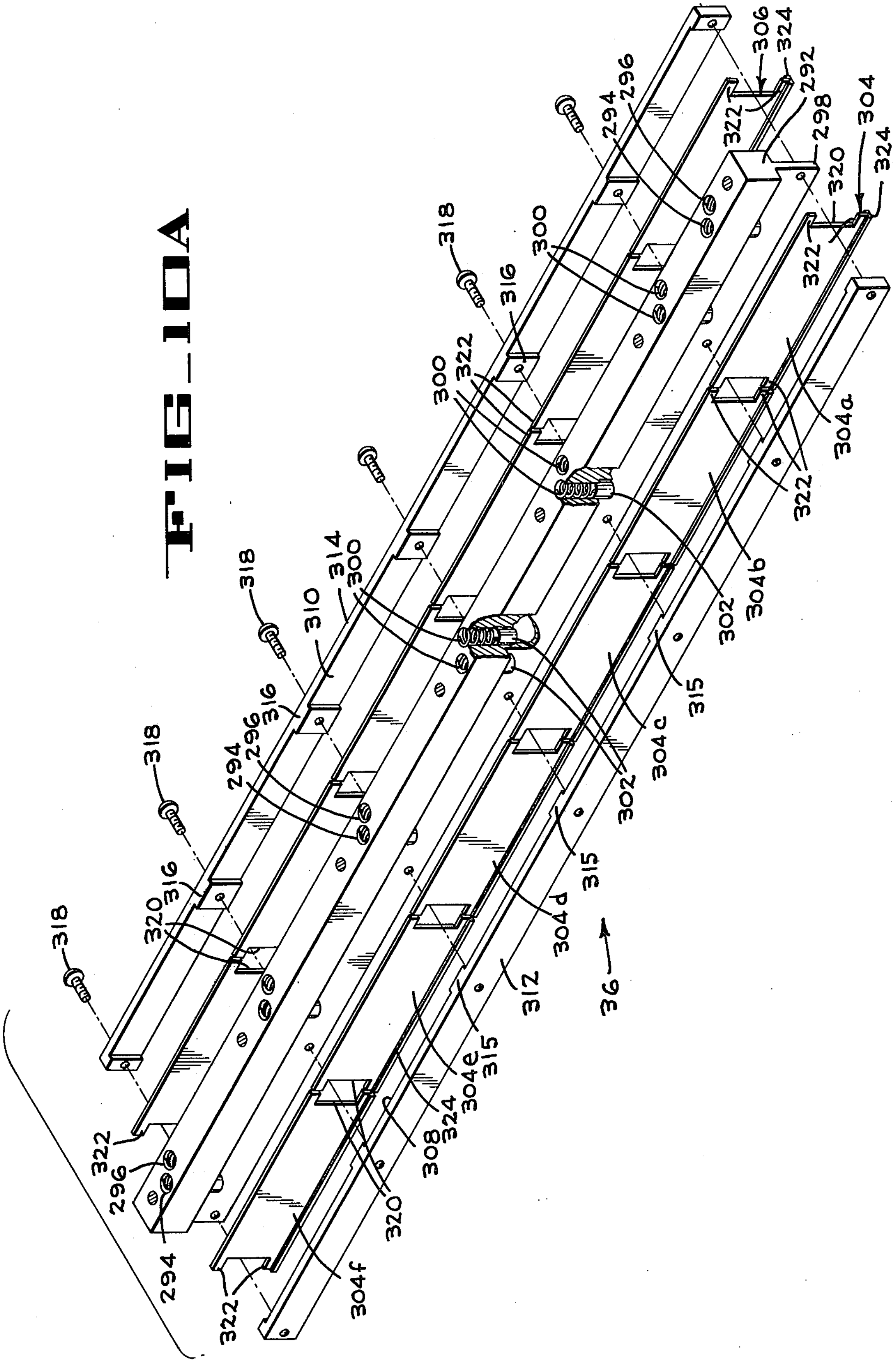
FIG. 10A is an exploded view of a portion of the upper sealing head illustrating the two series of transverse clamping elements.

As mentioned previously, the upper sealing head 36 is mounted for vertical reciprocal movement and pivotal movement between horizontal and vertical positions by means of stub shafts 112. The stub shafts 112 are rigidly secured to the ends of a transversely extending upper support beam 290 (FIGS. 5, 9 and 10). A T-shaped spring retaining and clamp guide beam 292 (FIG. 10A) is bolted to the beam 290 and includes two series of offset holes 294, 296 which partially extend into the tongue 298 of the guide beam. Each hole receives a compression spring 300 and a cylindrical guide block 302 which bears against the upper surfces of a selected one of a plurality of segments 304 *a–f* of an output web clamp 304 and an equal number of segments of an input web clamp 306. As indicated in FIG. 10A, each clamp segment is independent of the other segments and is urged downwardly by two of the springs 300. Each clamp segment is slidably guided on one side by the tongue 298 and on the other side by an inner guide surface 308 or 310 of a pair of associated transversely elongated guide plates 312 and 314, respectively. The guide plates include thick mounting blocks 315,316 which abut opposite sides of the tongue 298 and are secured thereto by capscrews 318 to maintain the clamp guiding surfaces 308,310 a sufficient distance from the tongue 298 to allow the clamp segments 304,306 to independently slide vertically relative thereto. As indicated in FIG. 10 and 10A, the ends of each clamp segment 304,306 are notched at 320 to provide abutment ears 322 which engage the associated square mounting blocks 315,316 to limit the downward movement of the clamp segments 304,306. As best shown in FIGS. 9 and 10, a generally U-shaped flexible resilient rubber strip 324 is preferably bonded to the lower edge of each clamp segment 304,306 thereby assuring a firmer grip on the web during the sealing and severing operation. It will be noted that the clamp elements are in alignment with the knurled web gripping portions 154*a*, 156*a* which aid in firmly gripping the web.

Two upper sealing bars comprising an input sealing bar 330 (FIG. 9) and an output sealing bar 332, are carried by the upper head 36. One of the upper sealing bars which is illustrated as the input upper sealing bar 330 is rigidly secured to the head 36 and moves therewith, while the other or output bar 332 is slidably mounted on the upper head. Also, one end of each of the upper seal bars 330 and 332 is slidably mounted to the upper head 36 in a manner which will permit linear expansion and contraction of the bars due to temperature changes therein.

The input sealing bar 330 includes the transversely extending support beam 290 having its opposite ends bolted to hanger brackets 336 which in turn are also bolted to the support beam 290. An elongated sealing pad 338 of electrical and heat insulating material is bolted to the lower end of the input sealing bar 330 and has an elongated groove therein which receives an electrical heat sealing wire 342.

Figure 11:
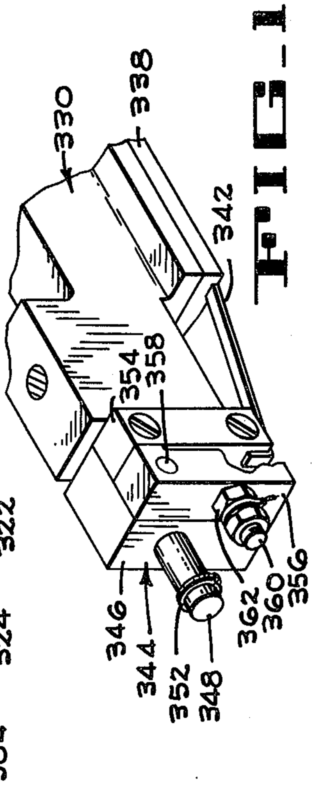
FIG. 11 is a perspective illustrating one of the upper heating wire clamps for mounting and applying tension to an upper heating wire of the upper sealing head.

In order to tightly hold the heating wire 342 and the equivalent heat sealing wire 342*a* of the output sealing bar 332 in operative position, both ends of each wire are secured to substantially identical resiliently loaded terminal clamps 344 (FIG. 10 and 11). Accordingly, the same numerals will be used to identify each clamp 344. Each clamp 344 includes the nylon insulating block 346 slidably mounted on a stub shaft 348 secured to and projecting outwardly from the associated ends of the input sealing bar 330. The nylong insulator 346 is urged outwardly by a compression spring 350 with the range of its travel being limited by a snap ring 352 secured to the stub shaft 348. A metal clamp block 354 is rigidly secured to the nylon insulator 346, and another cooperating metal clamp block 356 is pivoted to the nylon insulator 346 by a pin 358. A threaded terminal 360 is secured to the fixed block 354 and extends through a clearance hole in the pivoted block 356 enabling the associated end of the wire 342 to be clamped between the two blocks upon tightening of a nut 362 on the terminal.

A wide apron of Teflon cloth 366 is trained around the sealing pad 338 and has its end portions would on spools 368,370 to prevent the thermosealing web from sticking to the heat sealing wire 342. The spools 368,370 are journaled in the hanger bracket 336 and may be rotated to position different areas of the cloth 366 over the wire as mentioned in regard to the lower heating wires.

The upper output sealing bar 332 is substantially the same as the input sealing bar 330 except that it is slidably mounted on the upper head 36. Accordingly, the same numerals assigned to the input sealing bar followed by the letter *a* will be assigned to equivalent parts of the two evices, and such parts of the output sealing bar 332 will now be described in detail.

The output sealing bar 332 includes a transversely elongated support beam and insulated pad 338*a* having a heat sealing wire 342*a* held in operative position by spring loaded terminal clamps 344*a*. An apron of Teflon cloth 366*a* is trained around the output heating wire 342*a* and around spools 368*a*,370*a* journaled in the hanger brackets 380 bolted to the ends of the support beam 334*a*.

One side of each hanger bracket 380 is slotted as indicated in FIG. 9 to slidably receive an elongated leg 382 of a T-shaped (FIG. 3) guide bracket 384 that is bolted to the upper support beam 290 of the upper sealing head 36. The other side of each hanger is guided for sliding movement by an adjacent surface of the upper support beam 290. A compression spring 386 (FIG. 9) is received in a closed bore in a horizonal leg 388 of each T-shaped guide 384 and bears against the upper surface of the associated hanger bracket 380 to resiliently urge the output sealing bar 332 downwardly. An abutment block 390 is bolted to the lower end of leg 382 of each guide bracket 384 and projects into the path of the associated hanger bracket 380 to limit its downward movement.

It will be appreciated that the previously described adjustment screws 114 above the push rods 92 may be used to control the sealing pressure between the fixed input sealing bar 330 (FIG. 5) and the opposed corresponding lower sealing bar 156, while the springs 386 control the sealing pressure between the upper and lower output sealing bars 332 and 154.

Both upper sealing bars 330 and 332 are provided with a slight convex crown thereby providing uniform sealing pressure throughout the total length of the sealing bars. In this regard it has been determined that approximately an 0.02 inch deflection in the center of sealing bars that are about 31 inches long will provide uniform sealing pressure throughout the length of the bar when mounted as described herein. It will be apparent that the springs 386 of the upper output sealing bar 332 are of sufficient strength to deflect the bar during sealing to a substantially planar condition thereby assuring a quality seal. It is also apparent that the air pressure in the pneumatic cylinders 118 (FIG. 3) will be at least sufficient to overcome the resilience of both springs 386 and both upper sealing bars 330 and 332 as well as overcoming the force required by the spring loaded clamp segments 304 and 306.

FIG. 13 diagrammatically illustrates an electrical control circuit for the resistance heating wires 166, 168, 342 and 342*a* which receive electrical power from lines L1 and L2. The downsteam heating wires 166,342 *a* and upsteam heating wires 168,342 are independently controlled by switches S1 and S2, respectively. If both switches S1 and S2 are open as illustrated, power will not be transmitted to any of the heating wires and thus the wires will not be heated. With one or both of the switches S1 and S2 closed, power will be transmitted to the selected heating wires either through a circuit including a low temperature rheostat R1 and a normally closed relay contact R-1 or through a circuit including a high temperature rheostat R2 and a normally open relay contact R-2. Switching means in the form of a relay R (and its contacts R-1 and R-2) in series with the motor 46 and a start switch S3 determined which rheostat will be activated.

If the start switch S3 is open and the motor 46 dectivated, the low temperature rheostate R1 will direct sufficient power into the selected heating wires to raise the wires to the desired boding temperature for sealing the first bag entering the sealing and severing mechanism without burning or overheating that bag. It will be recognized, however, that the temperature of the wires drop as heat is transmitted to the first bag. Accordingly, upon closing start switch S3 motor 46 will be started and relay R will be energized thereby opening relay contact R-1 and closing relay contact R-2 to direct a greater amount of current through the high temperature rheostat R2 to the selected wires. The high temperature rheostat is adjusted to accommodate heat loss and to maintain the desired sealing temperature during normal sealing operation while the motor 46 is running and the web is being intermittently advanced through the sealing and severing mechanism in its normal manner with or without the web reversing feature previously described in regard to Lotto U.S. Pat. No. 3,813,998. When the motor 46 is turned off by opening switch S3, relay R is de-energized opening relay contact R-2 and closing contact R-1 to resume heating the selected wires through the low temperature rheostat R1.

As mentioned previously, the multipurpose sealing and severing mechanism 20 of the present invention may be used to make articles, such as bags or sheets, of many different sies and of several different types from webs of thermosealing wrapping material.

FIG. 14 illustrates a side weld bag B1 made from a longitudinally folded web W1 (or J-stock) that is intermittently moved in the direction indicated by the arrow thereon. Each bag B1 includes a closed folded end 400, an open end 402, an input seal 404 and an output seal 406 with the web being either perforated or completely severed at 408 between adjacent seals 404 and 406. Thus both switches S1 and S2 are closed to heat all four wires 166,168,342 and 342*a* when making this type of bag.

FIG. 15 illustrates a bottom weld, closed end first bag B2 formed from a tubular web W2 having closed folded side edges 410,412; an open end 414; a downsteam seal 415 formed by the input sealing bars 156,330. The web may be severed at 416 either by completely cutting through the web providing separate bags, or by merely forming perforations so that bags may be subsequently torn from a web W2 of interconnected bags by the ultimate user. Thus switch S2 is closed and S1 is open to heat only the upstream wires when forming this type of bag.

FIG. 16 illustrates a bottom weld, open end first bag B3 formed from the same type of tubular web W2 illustrated in FIG. 15 but with the intermittent movement of the web being such that the open end leads the closed end. The bag B3 includes closed side edges 418,420; an open end 422; and an upsteam seal 424 formed by the output sealers 154,332. Again, the cut at the open end or plane of severance 426 may either be mere perforations or complete severance depending upon customer demands. Thus, switch S1 is closed and switch S2 is open when forming this type of bag.

FIG. 17 illustrates the articles as flat sheets S which may be produced from either single or multiple webs. It is also to be understood that the web or webs may be folded or tubular if desired. When forming sheets, both switches S1 and S2 are open unless it is desired to weld one end of several sheets formed from a multiple web together.

Although the operation of the bag machine 22 has been partially described above, a brief summary of the normal operation after the motor 46 has been started and the adjustments needed to form each of the articles or bags illustrated in FIGS. 14–17 have been made, will now be described with the sequence of events which occur during each bag cycle being illustrated in FIG. 18.

In order to form side weld bags B1 of the type illustrated in FIG. 14, a roll R (FIG. 1) of longitudinally folded thermosealing wrapping material is placed on the machine 20 and its web W1 is trained between the web drive rolls 26,28; dancer rolls 30; and draw rolls 32,34.

Figure 18:
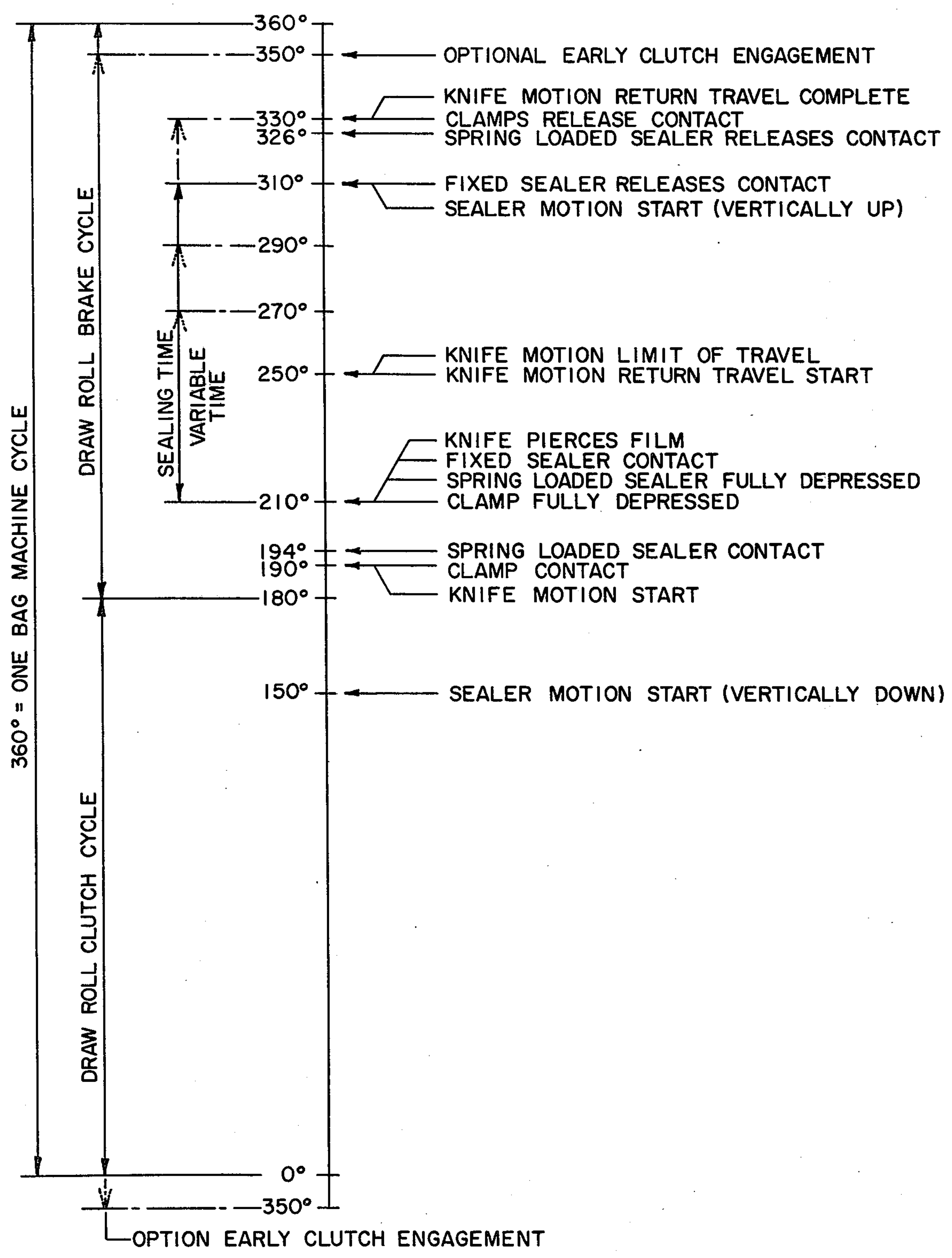
FIG. 18 is a timing diagram illustrating the sequence of operation of the several components of the machine.

The cam 71*a* (FIG. 2) is timed to ctuate the switch 71 which engages the clutch 72 and disengages the brake 74 of the clutch-brake assembly 70 at the 0° position of the crank shaft 50 as indicated in FIG. 18. It will be understood that the 0° (360°) position of each cycle occurs when the connecting rod 58 has advanced the gear segment 62 to one end of its stroke. At 0° the linear velocity of the draw rolls 32,34 is zero and as the gear segment 62 to one end of its stroke. At 0° the linear velocity of the draw rolls 32,34 is zero and as the gear segment 62 moves to the other end of its stroke (to the 180° position) the speed of the draw rolls gradually accelerates from zero velocity through a maximum velocity and back to zero velocity at the 180° point at which time the cam 71*a* actuates the switch 71 to disengage the clutch 72 and engage the brake 74. In this way excessive acceleration forces on the web, which is usually quite thin, is minimized. During each 0° to 180° position of the bag making cycle, the clutch 72 is engaged and the brake 74 is disengaged thereby advancing the web W1 one bag length. During each 180° to 360° portion of the bag cycle, the brake 74 is engaged and the clutch 72 is disengaged thereby holding the web W1 stationary and permitting the multipurpose sealing mechanism 20 to perform its sealing and severing operations on the stationary web.

The cams 37,38 on the continuously rotating crank shaft 50 operate through the push rods 90 (FIG. 3), adjustment screws 114, and the normally retracted air cylinders 118 to vertically reciprocate the upper cylinder head during the 180° to 360° portion of each bag cycle. When making side weld bags B1, switches S1 and S2 (FIG. 13) are closed and all rheostats R1 and R2 are properly adjusted to heat all four resistance heating wires 166,168, 342 and 342*a* to the desired sealing temperature for the particular web. If the bags B1 are to be completely severed from each other, the cutter link 254 (FIG. 3) is adjusted to raise the cutting edge of the knife 230 completely through the web W1. If it is desired merely to provide perforations between the bags, the link 254 is readjusted to permit the knife 230 to move upwardly only far enough to permit the points 231 of the serrated knife edge (FIG. 12) to penetrate the web W1.

Having reference to FIG. 18, the sequence of events occurring during the sealing and severing operation of each bag B1 commences when the upper sealing head 36 starts to move downwardly at about 150° of the bag cycle which is prior to termination of web movement into sealing and severing position. After the web W1 stops at 180° and at about 190° in the bag cycle, the knife begins to move upwardly and the segmented web clamps 304 and 306 engage the web W1 on both sides of the knife 230. At about 194° the resiliently or spring loaded upper output seal bar 332 engages the web W1. At about 210° in the cycle the segmented web clamps 304 and 306 are fully depressed, the spring loaded upper seal bar 332 is fully depressed, the rigid upper seal bar 330 is flattened and applies full sealing pressure on the web against the resistance of the lower sealing bars 154,156, and the cutter or knife 230 pierces the film. The knife 230 either completely severs or merely perforates the clamped web W1 between the 210° and 250° points in the bag cycle. The cutter cam 40 is timed so that the knife 230 completes its upward travel, and starts its return travel at 250°.

As mentioned previously, the cams 37,38 (FIG. 3), which reciprocate the upper sealing head 36, are adjustable to vary the dwell or time during which heat and pressure is applied to the web W1. When bags are being made from different types of thin webs, the dwell period may be between 210° to 270°–290°; whereas thicker webs may require a dwell between 210° to 310° or even 330°. If the dwell terminates at 310° as indicated by the solid arrow in FIG. 18, the upper sealing head 36 starts to raise at this time thereby immediately relieving sealing pressure between the fixed or input sealer bar 330 and the opposing lower bar 156. Continued upper movement of the upper sealing head 36 raises the spring loaded upper seal bar 332 at about 326° in the bag cycle, and releases contact of the segmented web clamps 304 and 306 at about 330° at which time the knife 230 completes its travel and returns to its starting position below the web W. At 360° (0° ) of the bag cycle the brake 74 (FIG. 2) is disengaged and the clutch 72 is engaged to initiate another bag cycle with a new bag length of web W1 being moved into sealing position between the 0° and 180° portion of the cycle.

If the bag machine 22 is to be used to make sheets S as illustrated in FIG. 17, a roll R of the desired type of material is placed on the machine 22 and the switches S1 and S2 (FIG. 13) to all four heating wires are turned off. With the heat off, the machine is operated as above described in regard to bags B1 causing the web to be clamped and severed during each cycle but without any heating or sealing function being performed.

When the bag machine 22 is used to make bottom weld, closed end first bags B2 as illustrated in FIG. 15, a web W2 tubular packaging material is trained through the machine 22 and the machine is operated as above described but with the downstream or output upper heating wire 342*a* and the opposed lower heating wire 166 turned off by opening switch S1 (FIG. 13). Thus, when making bottom weld, closed end first bags B2 with the multipurpose sealing and severing mechanism 20, only the upstream heating wires 334 and 168 are heated thereby providing a single transverse seal and cut for each bag cycle with the seal being upstream of the plane of severance.

It is apparent that the draw rolls 32,34 must push, as opposed to pull, the forward end of the rather flimsy web through the mechanism when side weld bags B1; or bottom seal, closed end first bags B2 are being made. If the sealed forward end of the web adheres to the heating wires 334 or 168, it is apparent that the web will not feed through the mechanism 20 but will jam behind the knife 230. If such condition occurs, the cam 71*a* (FIG. 2), which with switch 71 controls the actuation of the clutch-brake 70, may be retimed so that the clutch 72 engages early, i.e., during the reverse movement of the gear sector 62, at about 350° (FIG. 18) in the cycle thus reversing the draw rolls a short distance to positively strip the web from the Teflon covered heated wires 334 and 168 before normal forward feed is commenced. Such draw roll reverse is more fully described in the aforementioned Lotto U.S. Pat. No. 3,813,998.

When the bag machine 22 is used to make bottom weld, open end first bags B3 as illustrated in FIG. 16, a roll of tubular thermosealing material is mounted on the machine with the web W3 being trained through the machine. When making this type of bag, the operation is the same as that for side weld except that the upstream heating wires 168 and 342 are deactivated by opening switch S2 with heat being applied only by wires 166 and 342*a* which provides the seal at the trailing end of the bag. Early clutching of the draw rolls may be used, but is not required, since pick-off conveyors or the like 430 (only a fragment being shown in FIG. 5) similar to those described in the aforementioned Wech U.S. Pat. No. 3,663,338 will grip the finished bag B3 and pull it free from the heated downsteam wires.

From the foregoing description it is apparent that the multipurpose sealing and severing mechanism of the present invention includes pairs of upper and lower sealing bars with an electrical resistance heating wire in each sealing bar and with an oscillating web severing knife positioned to transversely sever the web along a plane disposed between the upstream and downsteam pairs of sealing bars. Both pairs of heating wires may be switches on or off independently of the others or only preselected pairs of heating wires may be used depending upon what type of articles (bags or sheets) are to be made. The drive to the web advancing draw rolls may either be timed to move the web only in a forward feed direction, or may be timed to move the web a short distance in a reverse direction prior to each bag length advancement of the web thereby positively stripping the web from the heated sealing wires. The degree of penetration of the cutter into the web may be adjusted to provide either complete severance of the web or to merely perforate the web. During the severing operation a series of spring loaded clamp segments are disposed on each side of the knife and extend the full width of the web to provide a uniform clamping pressure on the web between the area or areas being sealed and the plane of severance thereby preventing any tensioning forces due to the severing operation from being applied to the hot seal area which might results in weak or defective bags.

Although the best mode contemplated for carrying out the present invention has been herein shown and described, it will be apparent that modification and variation may be made without departing from what is regarded to be the subject matter of the invention.

We claim:

1. A multipurpose sealing and severing mechanism for making articles from a web of thermosealing material comprising: means for moving the web in a feed direction along a predetermined path; opposed pairs of sealing bars disposed on opposite sides of the path of movement of the web for applying sealing pressure to the web in two transverse zones; heating means associated with each sealing bar for raising the web to a bonding temperature along said zones when activated; severing means movable in a cutting plane extending transversely of the web and disposed between said zones; means for clamping the web between the sealing zones and both sides of said cutting zones; drive means for moving a sealing bar of each opposed pair of sealing bars and said clamp means into pressure engagement with the web and for causing said severing means to sever the web; and selectively operable electrical control means for connecting or disconnecting one or both pair of said opposed pairs of heating means from a source of electrical power.

2. An apparatus according to claim 1 wherein said heating means are electrical resistance heated wires, and wherein said control means includes independent switches in a circuit to the heating wires in each opposed pair of sealing bars to selectively activate or deactivate selected pairs of wire.

3. An apparatus according to claim 2 wherein the web is a longitudinally folded web and wherein said switches are all closed for directing power into all resistance heating wires to provide articles in the form of side weld bags.

4. An apparatus according to claim 2 wherein all said switches are opened for deactivating all of said resistance heating means for providing articles in the form of sheets.

5. An apparatus according to claim 2 wherein the web is a tubular web and wherein the switch controlling the heating wires upstream of said cutting plane is closed and the switch controlling the heating wires downsteam of said cutting plane is opened thereby heating only the upstream heating wires providing bottom weld closed and first bags.

6. An apparatus according to claim 2 wherein the web is a tubular web and wherein the switch controlling the heating wires downstream of said cutting plane is closed and the switch controlling the heating wires upstream of said cutting plane is open thereby heating only the downstream heating wires providing bottom weld, open end first bags.

7. An apparatus according to claim 2 wherein said control means also comprises a low temperature rheostat for heating all or selected opposed pairs of wires when the sealing and severing means is energized but said web moving means is deactivated, a high temperature rheostat for heating all or selected opposed pairs of wires when the moving means is activated for normal advancement of a web through the sealing and severing mechanism, and switching means responsive to deactivation and activation of said moving means for selectively controlling the energization of said low and high temperature rheostats.

8. An apparatus according to claim 1 wherein said severing means includes a knife, and wherein said drive means includes an adjustable linkage for controlling the distance of penetration of the knife into the web.

9. An apparatus according to claim 8 wherein said linkage is adjusted for causing said knife to completely sever the web.

10. An apparatus according to claim 8 wherein said knife is a toothed knife and wherein said linkage is adjusted for causing only the points of the knife to sever the web thereby merely perforating the web.

11. An apparatus according to claim 1 wherein said clamping means includes two segmented rows of clamping elements and resilient means for independently urging each clamping element toward the web for applying a uniform clamping force on the web throughout substantially the full width of the web.

12. An apparatus according to claim 11 wherein said rows of clamping elements are disposed on opposite sides of said cutting plane and between the cutting plane and the next adjacent heating means, said rows of clamping element being effective to grip the web with sufficient force to prevent web tensioning forces due to severance of the web from being applied to areas of the web being heated and sealed.

13. An apparatus according to claim 11 wherein each clamping element is provided with a flexible resilient strip on its web contacting surface for assuring a firm grip on the web during the severing operation.

14. An apparatus according to claim 13 wherein the portions of said opposed sealing bars in alignment with said clamping elements are transversely knurled for assuring a firm grip of the web between said clamping elements and said opposed sealing bars during the severing operation.

15. In a multipurpose mechanism for making articles from a web of thermosealing material comprising: means for intermittently moving the web in a feed direction along a predetermined horizontal path; means defining a stationary pair of lower sealing bars disposed below said path, means defining a vertically movable upper sealing head disposed above said path; a pair of sealing bars supported by said upper head in opposed relation with associated lower sealing bars and movable between a position spaced above the web and a position clamping the web against said lower bars; one of said upper sealing bars being fixed to said upper head and the other of said upper sealing bars being slidably mounted on said upper head; resilient means disposed between said head and said other sealing bar for resiliently urging said other sealing bar downwardly; at least one electrical heating means in each of said sealing bars for heating the web to a bonding temperature; control means for said heating means for controlling the temperature, the activation, and the deactivation of said heating means independently of the other heating means for providing one of a plurality of preselected heat sealing patterns on said web; and means for reciprocating said upper sealing head between a position spaced above the web and a position applying sealing pressure to the web in timed relation with the intermittent movement of said web for heat sealing the web when the web is stationary in accordance with a preselected one of said patterns.

16. An apparatus according to claim 15 wherein said control means also comprises a low temperature rheostat for heating all or selected opposed wires when the sealing and severing means is energized but when said web moving means is deactivated, a high temperature rheostat for heating all or selected opposed wires when the moving means is activated for normal advancement of a web through the sealing and severing mechanism, and switching means responsive to eactivation and activation of said moving means for selectively controlling the energization of said low and high temperature rheostats.

17. An apparatus according to claim 15 wherein said electrical heating means are electrical resistance wire heaters.

18. An apparatus according to claim 15 and additionally comprising web severing means disposed between the pairs of upper and lower sealing bars, means for moving said severing means into cutting engagement with said web, and clamping means carried by said upper sealing head on each side of said severing means and operable for resiliently clamping the web against said lower bars for preventing web severing forces from being applied to the heated areas of the web.

19. An apparatus according to claim 18 wherein said clamping means are segmented, and including a series of clamping plates on each side of said severing means; and resilient means for independently urging each plate downwardly for applying equal web clamping pressure throughout substantially the entire width of the web.

20. An apparatus according to claim 15 wherein each of said upper sealing bars are connected to said head at their transverse ends, and wherein said upper sealing bars are bowed downwardly from said ends when unstressed for providing a slight convex curvature in each bar which is straightened during the application of sealing pressure thereby providing uniform sealing pressure across the web during heat sealing.

21. An apparatus according to claim 20 and additionally comprising clamping means carried by said upper sealing head and operable for resiliently clamping the web against said lower seal bars; said means for reciprocating said upper sealing head including a pair of air cylinders for controlling the amount of sealing pressure transmitted to said heads; and means for maintaining sufficient air pressure in said cylinders during heat sealing for overcoming the resilience of said clamping means for overcoming the resilient means acting on said resiliently loaded upper sealing bar, and for overcoming the resilience necessary to flatten the convex curvature of both of said upper sealing bars; said air cylinders thereafter applying equal pressure to both of said upper sealing bars and also applying equal sealing pressure along the length of each of said upper sealing bars thereby providing a uniform lineal sealing pressure across the web below each of said upper sealing bars.

22. An apparatus according to claim 21 and additionally comprising web severing means disposed between the pairs of cooperating upper and lower sealing bars and means for moving said severing means into cutting engagement with said web.

23. In a sealing and severing mechanism for making articles from a web of thermosealing material, web clamping means comprising; a segmented row of clamping elements, support means for supporting said clamping elements for limited sliding movement relative thereto, resilient means in said support means for independently urging each clamping element toward the web, means for moving said support means and clamping elements toward the web with each said clamping element being moved into independent resilient engagement against the web for applying a uniform clamping force on the web throughout substantially the full length of the segmented row of clamping elements, and force resisting means on the other side of the web for resisting the clamping force.

24. An apparatus according to claim 23 wherein said moving means reciprocates said support means and said clamping elements toward and away from the web.

25. An apparatus according to claim 23 wherein said support means carries two spaced segmented rows of clamping elements.

26. An apparatus according to claim 23 wherein each of said clamping elements is a plate having a pair of spaced abutment ears projecting outwardly from each end; said support means including guide means for permitting independent sliding movement of said clamping elements, and abutment means disposed between said pairs of ears to limit the extent of sliding movement of said ears.

27. An apparatus according to claim 25 wherein each of said clamping elements is a plate having a pair of spaced abutment ears projecting outwardly from each end; said support means including guide means for permitting independent sliding movement of said clamping elements, and abutment means disposed between said pairs of ears to limit the extent of sliding movement of said ears.

28. An apparatus according to claim 26 and additionally comprising means defining a series of apertures in said supporting means and disposed in alignment with said plates, a cylindrical guide block in each aperture and disposed in engagement with an associated plate, a compression spring in each aperture engaging the associated cylindrical guide block, and means for closing the other ends of said apertures for compressing said springs, each of said clamping plates being contacted by a pair of said cylindrical blocks adjacent the ends thereof.

29. An apparatus according to claim 23 wherein each clamping element is provided with a flexible resilient strip on its web contacting surface for assuring a firm grip on the web during engagement with the web.

30. An apparatus according to claim 29 wherein the portion of said force resisting means in alignment with said clamping elements is transversely knurled for additionally assuring a firm grip on the web during the severing operation.

* * * * *

UNITED STATES PATENT OFFICE

CERTIFICATE OF CORRECTION

Patent No. 4,019,947 Dated April 26, 1977

Inventor(s) David K. Stock, et al

It is certified that error appears in the above-identified patent and that said Letters Patent are hereby corrected as shown below:

Column 1, line 27, change "macine" to --machine-- line 28, change "foled" to --folded-- line 29, change "reciprocaining" to --reciprocating-- line 41, change "Wecg" to --Wech-- line 58, after "machine" add --discussed--

Column 3, line 6, change "illustrting" to --illustrating--

Column 4, line 8, change "section" to --sector--
line 42 change "of" second occurance to --or--

Column 5, line 1, change "110" to --100--

Column 6, line 9, change "59" to --5-- line 48, change "gy" to --by--

Column 7, line 33, change "surfces" to --surfaces--

UNITED STATES PATENT OFFICE

CERTIFICATE OF CORRECTION

Patent No. 4,019,947 Dated April 26, 1977

Inventor(s) David K. Stock, et al

It is certified that error appears in the above-identified patent and that said Letters Patent are hereby corrected as shown below:

Column 8, line 22, change "nylong" to --nylon-- line 35, change "would" to --wound-- line 46, change "a" to --"a"-- line 47, change "evices" to --devices--

Column 10, line 7, change "seis" to --sizes-- line 62, change "ctuate" to --actuate--

Column 11, delete lines 1 and 2.

Column 13, line 9, change "switches" to --switched-- line 27, change "results" to --result--

Column 14, line 9, change "and" to --end--

Column 15, line 32, change "eactivation" to --deactivation--

Signed and Sealed this

*Twenty-seventh* Day of *November 1979*

[SEAL]

*Attest:*

RUTH C. MASON
*Attesting Officer*

LUTRELLE F. PARKER
*Acting Commissioner of Patents and Trademarks*